(12) United States Patent
Potak

(10) Patent No.: US 7,290,359 B2
(45) Date of Patent: Nov. 6, 2007

(54) PLOW MOUNTING METHOD AND APPARATUS

(75) Inventor: Robert L. Potak, Strongsville, OH (US)

(73) Assignee: Meyer Products LLC, Cleveland, OH (US)

( * ) Notice: Subject to any disclaimer, the term of this patent is extended or adjusted under 35 U.S.C. 154(b) by 146 days.

(21) Appl. No.: 10/790,431

(22) Filed: Mar. 1, 2004

(65) Prior Publication Data

US 2005/0000120 A1 Jan. 6, 2005

Related U.S. Application Data

(63) Continuation-in-part of application No. 10/638,642, filed on Aug. 11, 2003.

(60) Provisional application No. 60/442,275, filed on Jan. 24, 2003.

(51) Int. Cl.
*E01H 5/04* (2006.01)

(52) U.S. Cl. ............................ 37/231; 37/234; 37/236; 172/272

(58) Field of Classification Search ................. 37/231, 37/232, 234, 235, 266, 382; 172/272–275
See application file for complete search history.

(56) References Cited

U.S. PATENT DOCUMENTS

| 3,706,144 | A | * | 12/1972 | Miceli ......................... 37/234 |
| 4,807,375 | A | | 2/1989 | Iraci |
| 5,346,018 | A | * | 9/1994 | Koster ......................... 172/47 |
| 5,361,519 | A | | 11/1994 | Ciula et al. |
| 5,832,637 | A | | 11/1998 | Aguado et al. |
| 5,901,476 | A | | 5/1999 | Buonfiglio |
| 5,904,296 | A | * | 5/1999 | Doherty et al. ............... 239/61 |
| 5,987,785 | A | | 11/1999 | Aguado et al. |
| 6,044,579 | A | | 4/2000 | Hadler et al. |
| 6,138,388 | A | * | 10/2000 | Kost et al. ..................... 37/231 |
| 6,163,985 | A | | 12/2000 | Chinnery et al. |
| 6,240,659 | B1 | * | 6/2001 | Curtis et al. .................. 37/236 |
| 6,323,759 | B1 | | 11/2001 | Menze |
| 6,504,306 | B2 | * | 1/2003 | Menze ......................... 315/82 |

* cited by examiner

*Primary Examiner*—Thomas A Beach
(74) *Attorney, Agent, or Firm*—Roger D. Emerson; Timothy D. Bennet; Brouse McDowell

(57) ABSTRACT

In summary, therefore, the inventive method and apparatus enables one to mount and dismount an implement, such as a snow plow, from a vehicle, such as a pickup truck, with a heretofore unknown simplicity. The method mounting the plow basically comprises the steps of driving the vehicle toward the blade assembly until the frame assembly mounted on the front of the vehicle is in operative proximity to the blade assembly. Generally, that proximity is established by just touching the blade assembly with the frame assembly.

4 Claims, 9 Drawing Sheets

PLOW MOUNTING METHOD AND APPARATUS

This is a Continuation-In-Part patent application that claims priority to U.S. Utility patent application Ser. No. 10/638,642 filed on Aug. 11, 2003 and expressly incorporates by reference the entire specification of the application. The Utility patent application Ser. No. 10/638,642 claims priority to U.S. Provisional patent application Ser. No. 60/442,275, herein incorporated by reference, as filed on Jan. 24, 2003.

BACKGROUND OF THE INVENTION

1. Field of Invention

The present invention relates to a mounting device for attaching an implement, such as a plow mechanism as might be associated with a snowplow blade, or a rotary broom mechanism, or other such heavy implements, to the front end of a vehicle, such as a pickup truck. More particularly, the present invention relates to a self-aligning, hydraulically powered mounting device that enables one to easily mount and dismount an implement to a vehicle. The invention will be described with particular reference thereto. It is to be appreciated, however that the present invention may relate to other similar environments and applications. While the inventive mounting method and apparatus is highly adaptable to the application of a snow plow and a pickup truck, and that application will, in fact, be the focus of much of the description following, the invention is disclosed and claimed more broadly, and can be adapted to implements other than a plow and vehicles other than a pickup truck.

2. Discussion of the Art

Many vehicle owners have plow blades attached to the front ends of their vehicles. Often, a plow blade is removably or detachably mounted to the front end of a vehicle so that the plow blade can be selectively detached from the vehicle and stored when not in use and selectively attached from the vehicle and stored when not in use and selectively attached or reattached to the vehicle when the vehicle operator anticipates that plowing may be desired. Assemblies and mounting devices for removably attaching a plow blade to the front end of a vehicle are well known. Typically, these assemblies include a frame assembly semi-permanently connected to the vehicle or, more specifically, the chassis of the vehicle. "Semi-permanently connected," as used herein, refers to a connection that does not have to be broken each time the plow blade is detached from the vehicle. The plow blade is often connected to a blade assembly. The blade assembly is selectively engaged or connected to the frame assembly for mounting the blade to the vehicle. A lift assembly is often provided for lifting or positioning the relatively heavy plow blade relative to the vehicle.

One common connecting means and method used to connect the blade assembly and the frame assembly is the insertion of one or more pins through aligned holes on the frame assembly and the blade assembly. For example, with reference to U.S. Pat. No. 5,081,775 issued to Veilleux on Jan. 21, 1992, expressly incorporated herein by reference, a blade having an A-frame blade assembly is connected to brackets on the front end of a vehicle using pins extending through aligned holes. An adjustable lift arm is connected to a bracket assembly attached to the front of the vehicle. A link chain connects the blade assembly to the lift arm. The lift arm includes a hydraulic lift adapted to raise and suspend the blade assembly while the pins are inserted through the aligned holes.

Another example is U.S. Pat. No. 5,050,321 issued to Evans on Sep. 24, 1991, expressly incorporated herein by reference. The '321 patent discloses an attaching structure semi-permanently mounted to the front end of a vehicle and a snow plow moldboard structure including a plow blade releasably connectable to the attaching structure. Specifically, the attaching structure includes a pivot arm movable by a hydraulic lift. The pivot arm is connected to the moldboard structure by chains and is capable of lifting the moldboard structure when they hydraulic lift is actuated. When lifted, the moldboard structure is further connectable to the attaching structure by aligning one vertically spaced hole on the attaching structure to a hole in the moldboard structure and inserting a pushpin through the aligned holes.

The use of pins to connect the blade assembly to the frame assembly has been recognized as being difficult and tedious. Accordingly, numerous inventions have been directed towards facilitating the pin connection or replacing the pin connection altogether. For example, U.S. Pat. Nos. 6,151,808 and 6,240,659, issued to Curtis on, respectively, Nov. 28, 2000 and Jun. 5, 2001, both expressly incorporated herein by reference, disclose a jack and a control system for the jack for allowing proper vertical alignment of a lift frame having a plow blade relative to a receiver frame semi-permanently connected to a vehicle. Another patent, U.S. Pat. No. 4,976,054 issued to Jones on Dec. 11, 1990 and expressly incorporated herein by reference, discloses a leveling system for a snowplow blade.

Despite prior art attempts to facilitate the attachment of a plow blade to a vehicle, there remains a need for a plow-mounting device that allows a plow blade to be removably connected to a vehicle with relative ease. Any improved plow mounting device that provides a relatively quick and easy connection and/or facilitates in aligning the plow blade on the vehicle is deemed particularly desirable.

THE INVENTION

The present invention provides a new and improved mounting device that overcomes the foregoing difficulties and others and provides the aforementioned and other advantageous features. More particularly, in accordance with one aspect of the present invention, a pinless and leverless mounting device is provided for removably attaching a plow blade to the front of a vehicle.

More particularly, in accordance with this aspect of the invention, the mounting device includes a frame assembly semi-permanently connected to a front end of an associated vehicle. A blade assembly has a plow blade and grasping assembly. The grasping assembly includes at least one lower hook and at least one upper hook. The lower and upper hooks are capable of grasping the frame assembly when the grasping assembly includes at least one lower hook and at least one upper hook. The lower and upper hooks are capable of grasping the frame assembly when the grasping assembly is in a closed position and capable of releasing the frame assembly when the grasping assembly is in an open position. The blade assembly is connected to the frame assembly by positioning the frame assembly adjacent the blade assembly and moving the grasping assembly from the open position toward the closed position. The blade assembly is disconnected from the frame assembly by moving the grasping assembly from the closed position to the open position. The invention enables an operator of a vehicle to dismount a plow assembly from the vehicle, leave it standing in an upright, ready position when said plow is temporarily removed from an associated vehicle, an enables the operator to again mount the plow to the vehicle with a minimum of effort and connections required.

According to another aspect of the invention, a method of storing a plow in an upright, ready position is disclosed. The method comprises when said plow is temporarily removed from an associated vehicle, the method comprising the steps of providing a blade assembly operatively associated with the plow, the step of lowering a lower engaging member of the lift assembly until it contacts a surface upon which the blade assembly is to be set, and the step of orienting said lift assembly in a ready position.

According to another aspect of the invention, an alignment means for aligning an implement onto a frame assembly, said alignment means comprises an inclined surface and a stop at a first end of said inclined surface.

According to another aspect of the invention, an assembly for use on an associated vehicle, said assembly comprises a first frame member, and a first angled surface, the first angled surface having a centerline which makes an angle Y, with an angle Y having a measurement of between 5 degrees and 85 degrees with a horizontal line.

According to another aspect of the invention, a mount/dismount assembly for mounting and dismounting an implement from a vehicle, said mount/dismount assembly comprising a frame assembly, said frame assembly mounted on the associated vehicle, an implement assembly; and, a lift assembly, said lift assembly being operatively associated with said implement assembly and said frame assembly, said lift assembly having a lifting means for lifting and an attaching means for attaching, said lifting means capable of lifting said lift assembly and said implement assembly upwardly until said attaching means engages said frame assembly, thereby mounting the implement onto the associated vehicle.

According to another aspect of the invention, the frame assembly for mounting on an associated vehicle, said frame assembly comprising a first angled surface, the first angled surface having a centerline which makes an angle of between 5 degrees and 85 degrees with a horizontal line.

According to another aspect of the invention, a frame assembly for enabling the mounting of implements on an associated vehicle, said frame assembly comprising first and second substantially vertical portions; a substantially horizontal member, said horizontal member having a first end connected to an end of said first vertical members and a second end connected to a first end of said second vertical member; first and second arms, a first end of each of said arms being operatively connected to said frame assembly, and said second end of each of said arms being operatively connected to an associated vehicle frame of said associated vehicle, said first and second arms having a height, said height of first arm being less than six inches (6 inches), whereby a ground clearance of the associated vehicle is lowered by six inches or less due to the presence of the frame assembly.

According to another aspect of the invention, a mounting assembly for mounting a plow assembly onto an associated vehicle so that said plow assembly remains essentially level when in the raised position, said mounting assembly comprising a frame member, said frame member having a front end and a back end, said front end of said frame member being pivotably connected to said plow.

According to another aspect of the invention, a method of connecting electric lines for a plow and vehicle combination, the method comprising the steps of positioning a frame assembly associated with the associated vehicle in operative proximity to a lift assembly associated with said plow; and connecting a first electrical connection to a second electrical connection, said first electrical connection being mounted upon and operatively associated with the associated vehicle, said second electrical connection being mounted upon and operatively associated with said lift assembly.

According to another method of providing hydraulic power to a plow and vehicle combination, the method comprising the steps of positioning a frame assembly associated with the associated vehicle in operative proximity to a lift assembly associated with said plow; creating an electrical conduit by connecting a first electrical connection to a second electrical connection, said first electrical connection being mounted upon and operatively associated with the associated vehicle, said second electrical connection being mounted upon and operatively associated with said lift assembly, and, sending electrical power through said electrical conduit to a hydraulic pump operatively associated with said lift assembly.

BRIEF DESCRIPTION OF THE DRAWINGS

The invention may take physical form in various components and arrangements of components. The drawings are only for purposes of illustrating a preferred embodiment and are not to be construed as limiting the invention.

PREFERRED EMBODIMENTS

Figure 1:
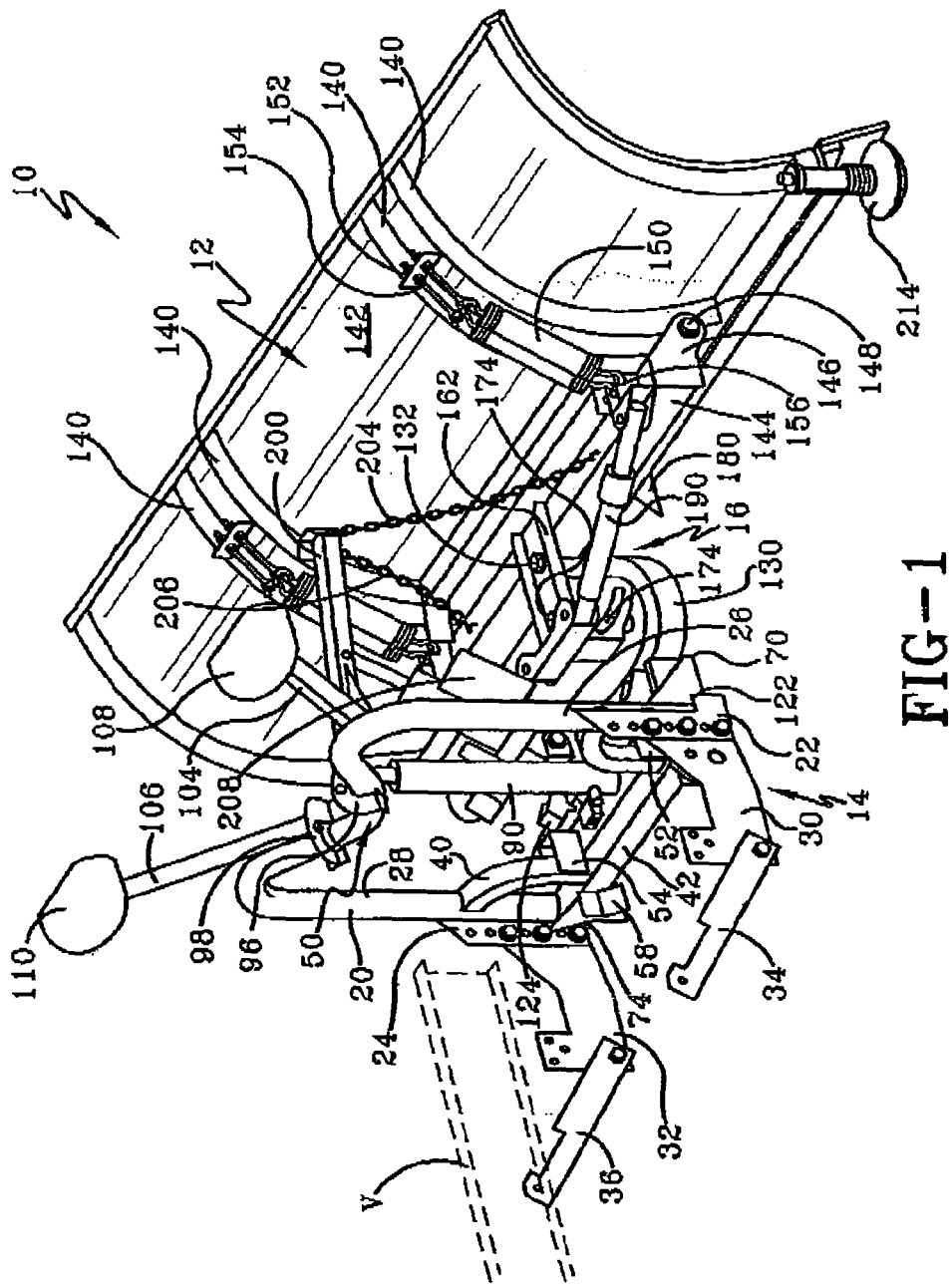
FIG. 1 is a rear perspective view of a plow mounting device showing a frame assembly capable of being semi-permanently connected to a vehicle and a blade assembly having a plow blade and a grasping assembly in a closed position releasably connected to the frame assembly in accordance with a preferred embodiment of the present invention.

Referring now to the drawings wherein the showings are for purposes of illustrating the preferred embodiment of the invention only and not for purposes of limiting the same, FIG. 1 shows a plow mounting device or assembly generally designated by reference numeral 10. The plow mounting assembly 10 allows a conventional plow blade 12 to be removably or detachably mounted to the front of an associated vehicle V (partially shown in FIG. 4). The invention enables the plow blade 12 to be selectively attached to the vehicle when it is anticipated that it might be desirable to use the plow blade 12 and selectively detached from the vehicle and stored when it is anticipated that the plow blade will not be needed.

Figure 2:
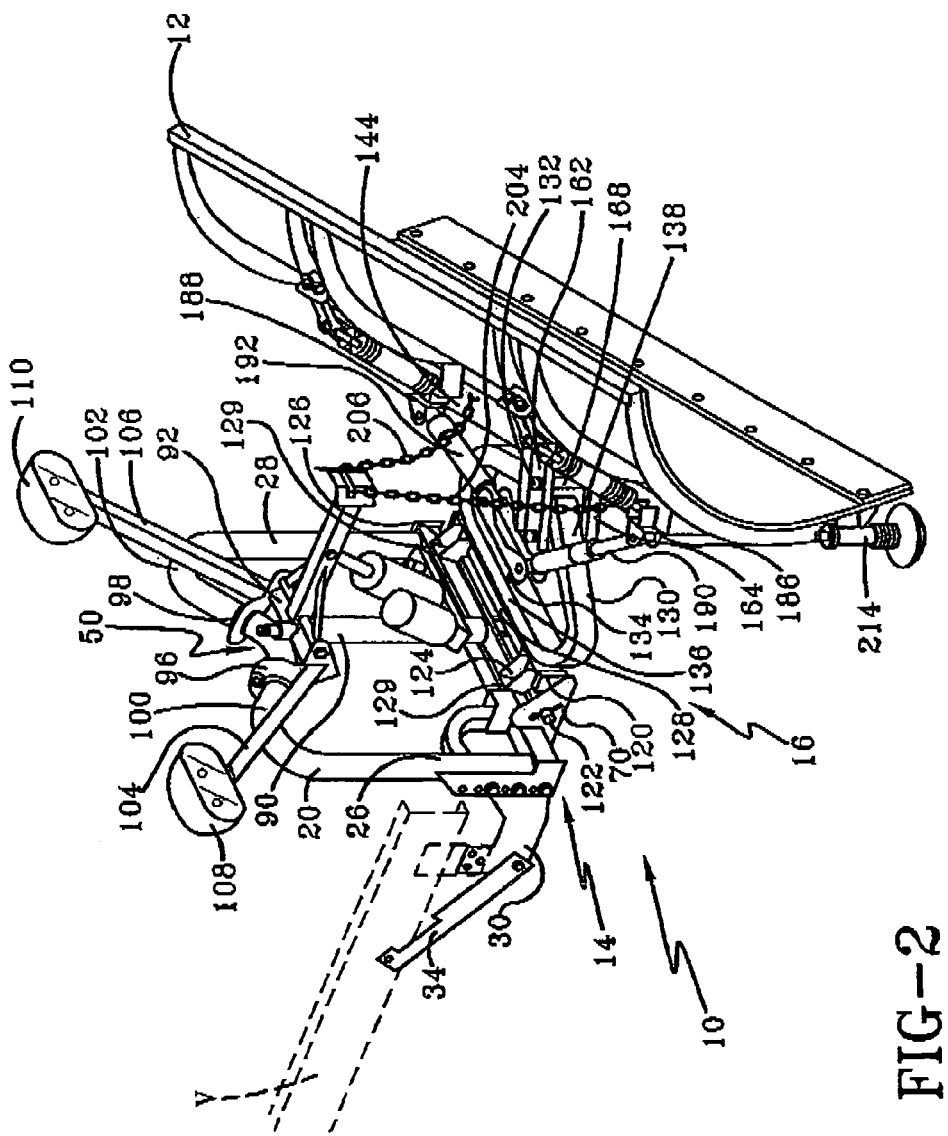
FIG. 2 is a front perspective of the plow mounting device of FIG. 1 showing the blade assembly.
Figure 3:
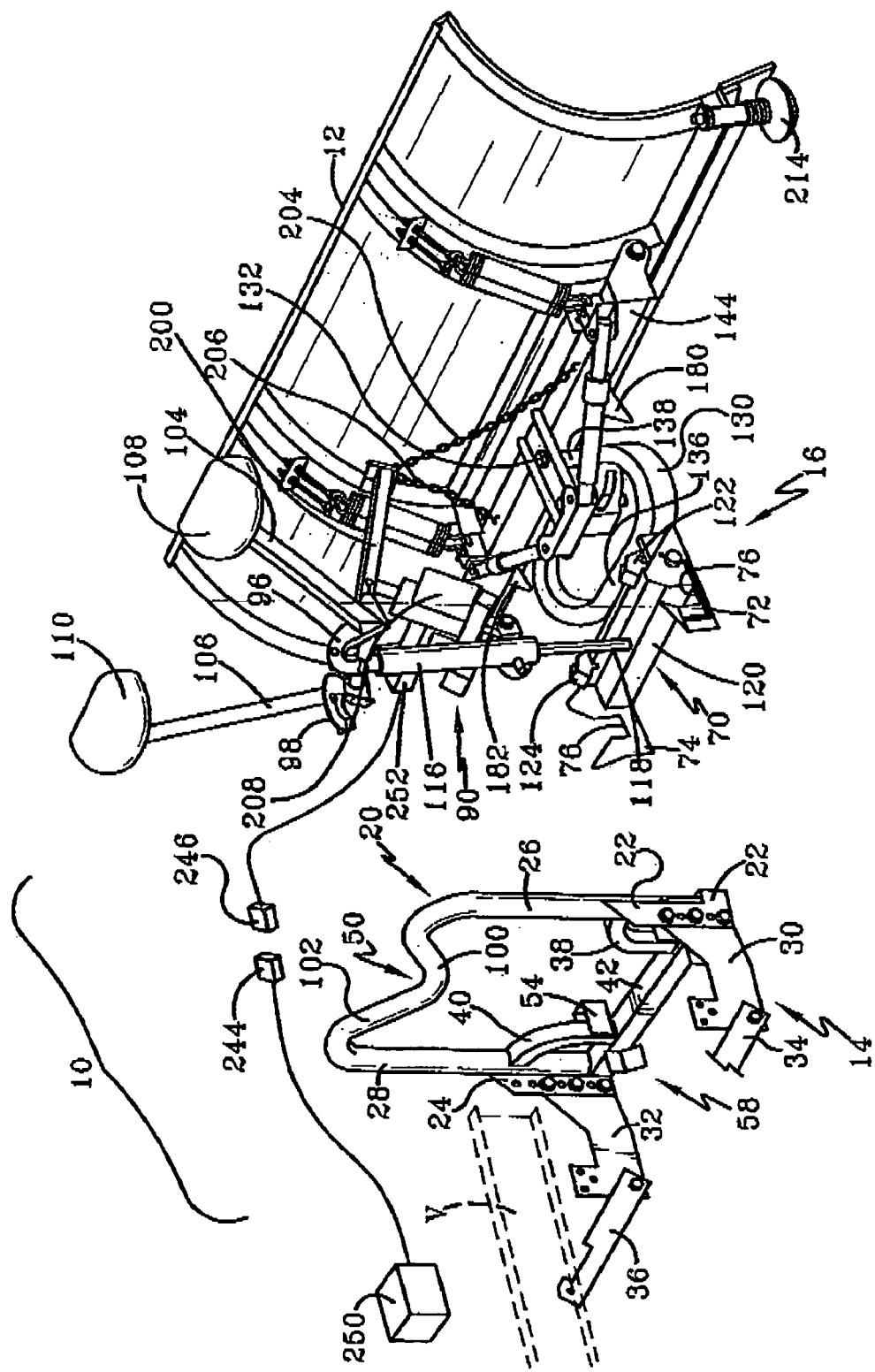
FIG. 3 is a rear perspective view of the plow mounting device of FIG. 1 showing the grasping assembly of the blade assembly in an open position and is connected from the frame assembly.

With reference to FIGS. 1–8, and more specifically FIG. 3, the plow mounting assembly 10 generally includes a frame assembly 14 adapted to be semi-permanently connected or mounted directly on the front end of the vehicle V. The frame assembly 14 is a generally non-interfering structure when attached to the front of the vehicle, i.e., the frame assembly 14 does not interfere with functions of the vehicle. At least a portion of the frame assembly 14 can be coated with vinyl or chrome. Further, the frame assembly 14 can serve as a brush guard with its lower horizontal portion 42 and upper portion 50 when attached to the vehicle and the plow blade 12 is not mounted thereto.

The plow mounting assembly 10 further includes a blade or lift assembly 16 that carries the plow blade 12. As will be described in more detail below, the blade assembly 16 is selectively engageable or connectable to the frame assembly 14. Thus, when the frame assembly 14 is semi-permanently connected to the vehicle and the blade assembly 16 carries the plow blade 12, engagement between the blade assembly 16 and the frame assembly 14 serves to mount the plow blade 12 to the front of the vehicle.

More specifically, the frame assembly 14 includes a frame member 20 that, in the preferred embodiment, is shaped like the letter "M" and is oriented in a generally upright position. While the "M" shape is the preferred shape, other shapes are capable of carrying out the purposes of the invention. For example, a "V" shaped frame could be used and is considered within the scope of the present invention. A "V" shaped frame could be configured without vertical portions making up the "M" shaped frame, of the preferred embodiment. Further, equivalent structures having only a single inclined or sloped surface (as opposed to the two inclined or sloped surfaces of the "M" shaped frame member 20) could also be made to work as equivalents.

Figure 5:
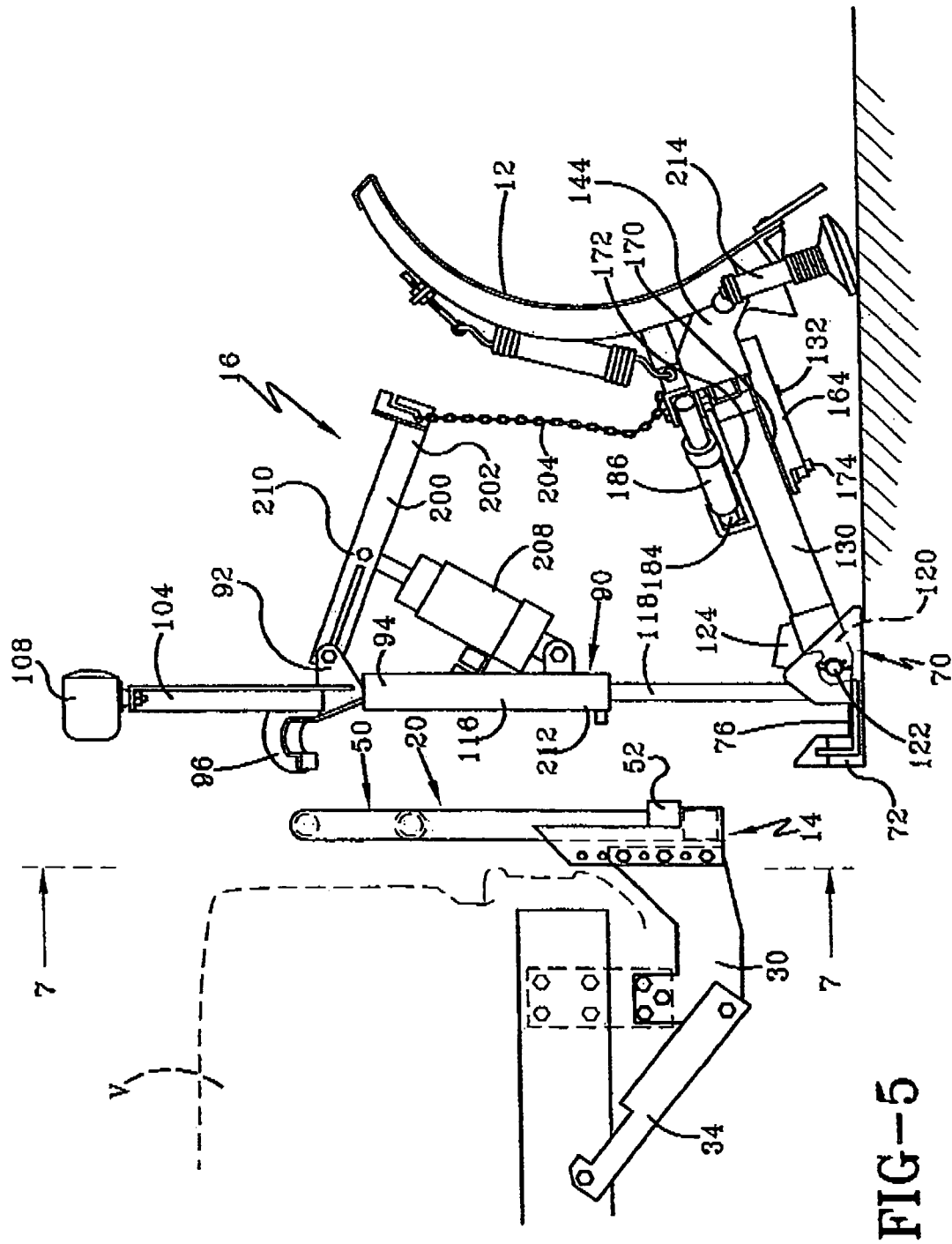
FIG. 5 is a side elevational view of the plow mounting device of FIG. 3.

With reference to FIGS. 3 and 5, a pair of flange members 22,24 extend from vertical portions 26,28 of the M-shaped frame 20. A pair of arms 30,32 having holes therethrough are connected, respectively, to each of the flange members 22,24. The arms 30,32 extend perpendicularly relative to the frame 20. Arm extensions 34,36 are pivotally connected to the arms 30,32 at the distal ends thereof. The arms 30,32 and arm extensions 34,36 are used to semi-permanently mount the frame assembly 12 to the vehicle V. The frame assembly 14 further includes reinforcing members 38,40 connecting the vertical portions 26,28 to a generally lower horizontal portion 42 of the M-shaped frame 20. The particular structure shown provides excellent ground clearance. More particularly, the height of the arms 30,32 is less than about six (6) inches, whereby a ground clearance of the associated vehicle is lowered by about six (6) inches or less due to the presence of the frame assembly.

An upper or M-shaped portion 50 of the frame 20 spaced from the lower portion 42 provides an aligning means or centering shape for aligning or centering the blade assembly 16 on the frame assembly 14 as will be described in more detail below. The frame 20 includes a pair of contact members or stops 52,54 for engaging a portion of the blade assembly 16. The contact members 52,54 extend perpendicularly relative to the frame 20 and in a direction opposite the arms 30,32. The contact members 52,54 are positioned immediately above the horizontal portion 42 and each extends generally from a respective one of the reinforcing members 38,40.

Figure 6:
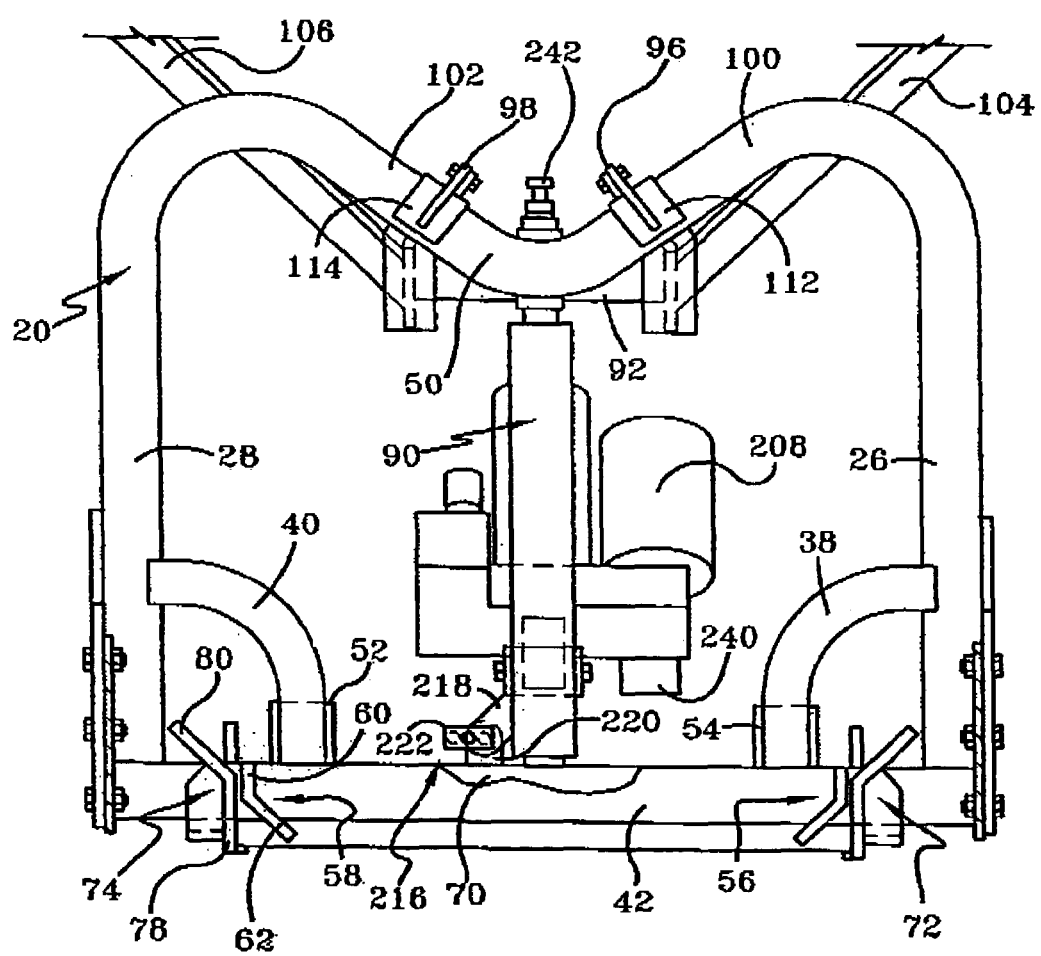
FIG. 6 is a rear elevational view of the plow mounting device of FIG. 1.

With reference to FIGS. 1 and 6, lower centering guides 56,58 are provided on the lower horizontal portion 42 on a side thereof opposite the contact members 52,54. Each of the lower centering guides 56,58, also referred to herein as guiding members, includes a vertical portion 60 and an angled portion 62. The centering guides 56,58 function to align and center the blade assembly 16 relative to the frame assembly 14 when the blade assembly 16 is being connected to or engaged with the frame assembly 14 and the blade assembly 16 is slightly misaligned or uncentered relative to the frame assembly 14. The contact members 52,54 function to maintain or limit the position of the blade assembly 16 relative to the frame assembly 14 when the two components 14,16 are connected.

With reference to FIGS. 3 and 5, the blade assembly 16 includes a lower engaging member 70 that abuts or contacts the frame assembly 14 when the blade assembly 16 is connected thereto. The engaging member 70 includes a first clasp or fastener that, in the illustrated embodiment, is a pair of upwardly extending clamps or hooks 72,74 spaced apart from one another. The hooks 72,74 each define a recess 76 appropriately shaped to engage and securely receive the lower horizontal portion 42 of the frame assembly 14. With reference to FIG. 6, the spacing between the hooks 72,74 is such that when the horizontal portion 42 is received in the recesses 76 the hooks 72,74 are slightly outside the centering guides 56,58. Each of the hooks 72,74 includes a vertical portion 78 and an angled portion 80. The angled portion 80 is approximately the same as or at an angle that substantially matches the angle of the angled portions 62 of the centering guides 56,58. The positioning between the guides 56,58 and the hooks 72,74 and the angled portions 62,80 function to center and align the blade assembly 16 relative to the frame assembly 14 when the frame assembly 14 is connected or being connected to the blade assembly 16.

With reference back to FIGS. 3 and 5, the blade assembly 16 further includes a grasping assembly for removably connecting to the frame assembly 14. The grasping assembly includes the lower engaging member 70, a telescoping cylinder 90 and an upper engaging member 92. The telescoping cylinder 90 extends vertically upward from the lower engaging member 70. The cylinder 90 is oriented in a position that is generally parallel to the upright frame 20 when the blade assembly 16 is connected to the frame assembly 14. The cylinder 90 is movable between a closed or collapsed position and an open or expandable position. In the preferred embodiment, the cylinder 90 is a conventional hydraulic cylinder actuated by a conventional hydraulic pump (shown schematically as a rectangle and labeled 240 in FIG. 6). The cylinder 90 can also be a conventional self-locking cylinder that locks in the open position or the closed position when the cylinder 90 is in one of these positions and the hydraulics of the cylinder are not actuated. Alternatively, the cylinder 90 could be any other actuator such as, for example, an acme screw with an electric motor.

The upper engaging member 92 is located at or adjacent an upper end 94 of the cylinder 90. The upper engaging member 92 includes a second clasp or fastener that, in the illustrated embodiment, is a pair of opposed, downwardly extending clamps or hooks 96,98 spaced apart from one another and angled to substantially match first and second angled sections 100,102 of the upper portion 50. The sections 100,102 together form a V-shape that generally centers the blade assembly 16 relative to the frame assembly 14. More specifically, the angled sections 100,102 are angled between about five (5) degrees and about eighty-five (85) degrees relative to their respective vertical portions 26,28 or generally horizontal plane. The hooks 96,98 are appropriately positioned to engage the first and second angled sections 100,102 when the blade assembly 16 is connected to the frame assembly 14.

Figure 9:
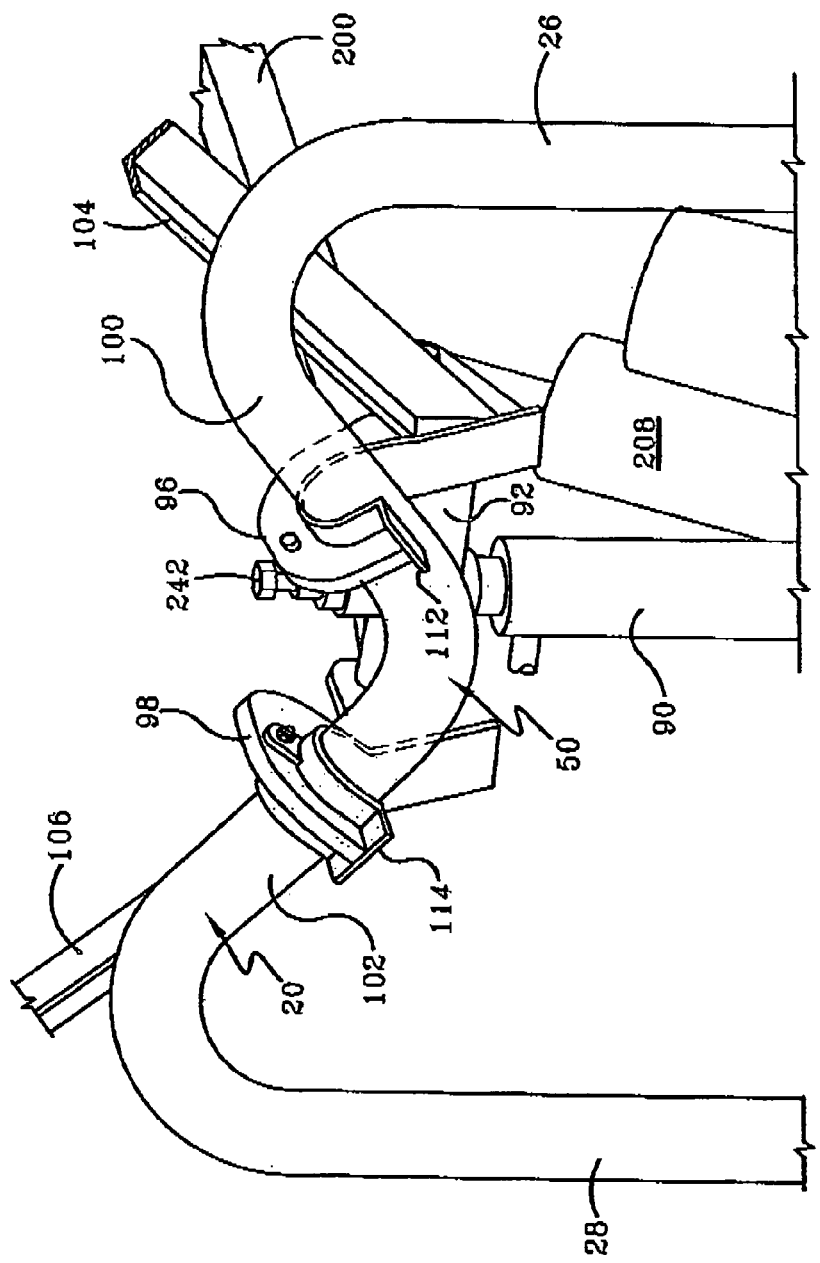
FIG. 9 is another enlarged partial rear perspective view of the plow mounting device of FIG. 1 showing a set of Teflon coated pads on the upper hooks.

The upper engaging member 92 can additionally include arms 104,106 for supporting lights 108,110 at distal ends thereof. The lights 108,110 can be directed or positioned to illuminate an area beyond the plow blade 12 particularly when the plow blade 12 obstructs the lights of the vehicle V. With-reference to FIG. 9, the hooks 96,98 can include protective inserts or pads 112,114 to prevent or reduce scratching of the M-shaped member 20 when connecting the blade assembly 16 to the frame assembly 14. In the preferred embodiment, the pads 112,114 are coated with a low friction material such as TEFLON™.

Thus, with reference back to FIGS. 3 and 5, the cylinder 90 extends between the upper hooks 96,98 and the lower hooks 72,74. More specifically, the cylinder 90 includes an elongated tubular portion 116 depending from the upper engaging member 92 and an elongated cylindrical portion 118 telescopingly received in the tubular portion 116 and extending from the lower engaging member 70. The cylindrical portion 118 extends from the tubular portion 116 when the grasping assembly is in the open position and is retracted within the tubular portion 116 when the grasping assembly is in the closed position.

With additional reference to FIG. 2, the blade assembly 16 further includes a lift bar 120 is pivotally connected to the lower engaging member 70 by a first pivot pin 122 that is generally parallel to a wheel axis of the vehicle and the width of the vehicle when the blade assembly 16 is connected to the frame assembly 14 on the vehicle V. The first pivot pin 122 includes a grease fitting which extends the useful life of the pivot pin connection. The lift bar 120 is generally oriented in a position parallel relative to the lower engaging member 70. As a result, the lift bar 120 and the plow blade 12 are able to pivot up and down relative to the lower engaging member 70, the front end of the vehicle and/or the ground thereby allowing the plow blade 12 to be raised and lowered relative to the ground.

The lift bar 120 includes a pair of stops 124,126 adjacent an upper side 128 of the lift bar 120 for limiting pivotal movement of the lift bar 120 relative to the engaging member 120. More specifically, the stops 124,126 are aligned with the stops or contact members 52,54 when the blade assembly 16 is connected to the frame assembly 14 and angled surfaces 129 of the stops 124,126 will abut vertical surfaces of the contact members 52,54 when the lift bar 120 is pivoted to a predetermined angle relative to the lower engaging assembly 70. The predetermined angle is determined by the angled surfaces 129 of the stops 124,126 and the distances between the stops 124,126 and the contact members 52,54.

A horizontal plow frame member 130 constructed of formed rectangular tubing is rotatably connected to the plow blade 12 by a second pivot pin 132 and to the lift bar 120 by a third pivot pin 134. Like the first pivot pin 122, the second and third pivot pins 132,134 each include a grease fitting which extends the useful lives of the second and third pivot connections. The third pivot pin 134 is defined along a portion of a longitudinal axis extending along the longitudinal length of the vehicle and allows the frame member 130 to pivot rotatably relative to the lift bar 120. More specifically, the third pivot pin 134 allows the plow blade 12 to rotate about said longitudinal axis for allowing the plow blade 12 to remain generally parallel to the ground.

The frame member 130 is generally tear drop shaped or candy kiss shaped and is oriented generally perpendicularly relative to the frame 20 when the blade assembly 16 is connected to the frame assembly 14. With additional reference to FIG. 3, the frame member 130 includes a rear portion 136 that is substantially flat or straight and positioned adjacent the lift member 120. The rear portion 136 is the portion of the frame member 130 that is rotatably connected to the lift bar 120. Specifically, the rear portion 136 is rotatably connected to the lift bar 120 adjacent a center of the lift bar 120 and the rear portion 136. The frame member 130 further includes a front portion 138, also referred to herein as an apex portion, that is generally pointed and positioned opposite the rear portion 136. Rounded portions connect or extend between the base portion 136 and side portions that form the pointed portion 138. As already discussed, the third pivot pin 134 connecting the frame member 128 to the lift bar 120 allows the plow blade 12 to rotatably pivot and thereby follow the contour of the road.

With reference to FIG. 1, the plow blade 12 includes ribs 140 vertically oriented on a non-plowing surface 142 of the blade 12. With additional reference to FIG. 4, a plow mounting beam 144 is connected to the plow blade 12 and extends horizontally along the surface 142. The beam 144 includes a plurality of flanges 146 that pivotally connect to the ribs 140 with the use of suitable fasteners such as threaded connectors 148. The relatively wide mounting beam 144 provides increased rigidity to the blade assembly 16. Tensioning springs 150 also connect the plow blade 12 to the mounting beam 144. More particularly, the plow blade 12 includes spring mounting flanges 152 positioned above the connections between the ribs 140 and the flanges 146. The spring mounting flanges 152 receive suitable spring mounting or tensioning bolts 154 therethrough that connect to first ends of the springs 150. The second ends of the springs 150 connect to spring mounting flanges 156 formed integrally on the mounting beam 144.

With reference to FIG. 2, the mounting beam 144 is rotatably or pivotally connected to the pointed portion 138 of the frame member 130. More specifically, the mounting beam 144 includes an upper arm 162 and a lower arm 164. The arms 162,164 extend away from the plow blade 12 in a direction generally perpendicular relative to a longitudinal length of the mounting beam 144. The second pivot pin 132 rotatably connects the arms 162,164 of the mounting beam 144 to the frame member 130. Specifically, the second pivot pin 132 extends through the upper arm 162, through a sleeve 168 defined in the pointed portion 138 of the frame member 130 and through the lower arm 164 thereby allowing the mounting beam 144 to pivot relative to the frame member 130 which allows the plow blade 12 to be positioned at an angle relative to the front of the vehicle. More specifically, the second pivot pin 132 allows the plow blade 12 to pivot left and right relative to the front end of the vehicle V. The lengths of the upper and lower arms 162,164 correspond to a maximum pivot angle allowed by the mounting beam 144 and the plow blade 12.

Figure 4:
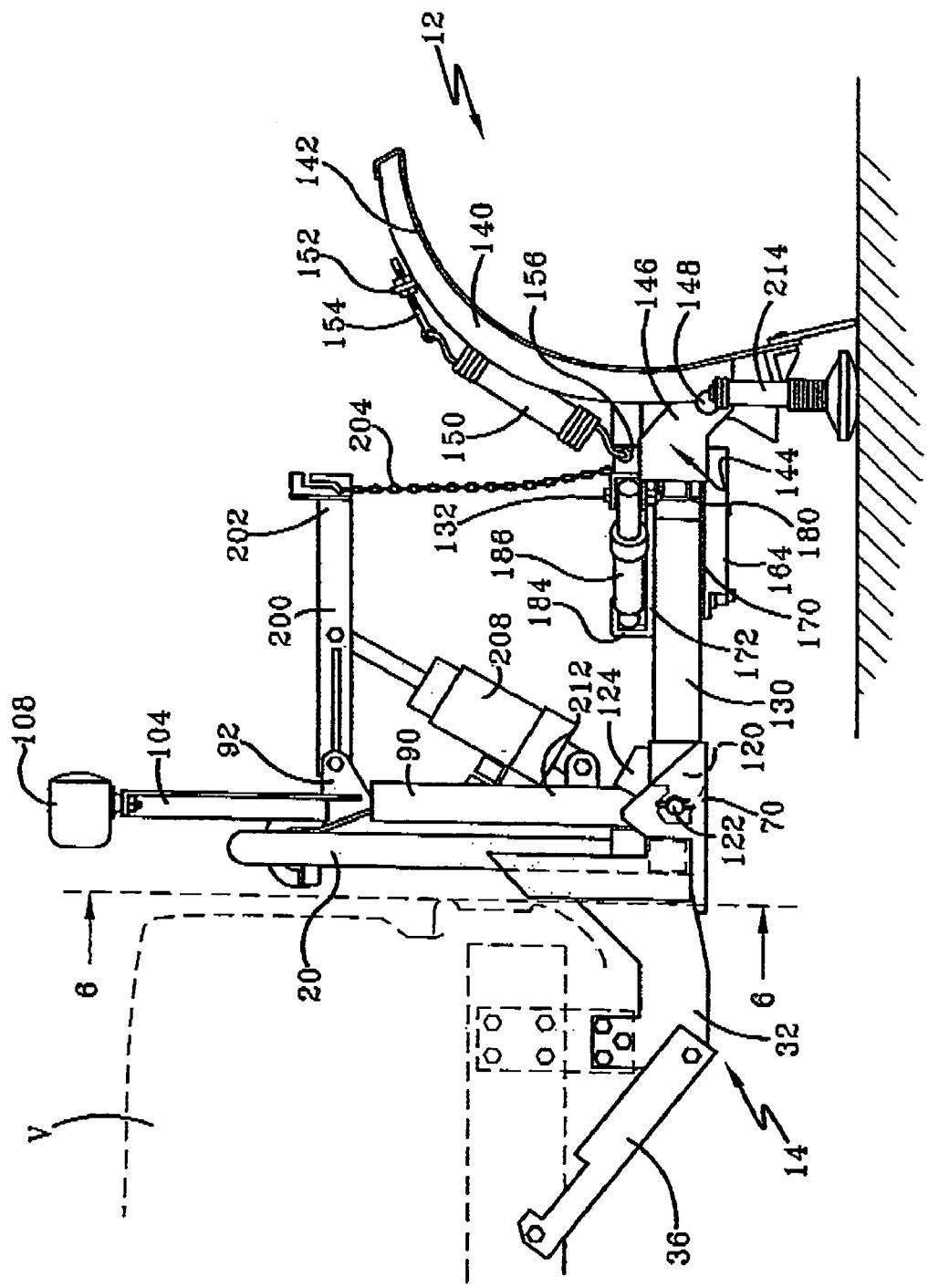
FIG. 4 is a side elevational view of the plow mounting device of FIG. 1.

With reference to FIG. 4, a lower guide plate 170 is sandwiched between the sleeve 168 and the lower arm 164. An upper guide member 172 is sandwiched between the sleeve 168 and the upper arm 162. The guide plate 170 and the guide member 172 extend into a center portion of the frame member 130 and remain fixed relative to the frame member 130. A guide pin 174 (see also FIG. 1) also rotatably connects the arms 162,164 and the frame member 130 at a preselected distance beyond the second pivot pin 132. The pin 174 extends through the arms 162,164 at a distal location on the arms 162,164 relative to the second pivot pin 132 and passes through the center portion or interior of the frame member 130. The guide plate 170 and the guide member 172 each include respective slots that receive the second pivot pin 174 therethrough. The slots guide the pivot of the mounting beam 144 relative to the frame member 130 and provide stops or limits to the degree of pivot permitted between the beam 144 and the frame member 130.

Additionally, with reference to FIG. 3, pivoting is limited by stops or protrusions 180,182 extending from the mounting beam 144. Rubber members or TEFLON™ inserts may be added to or substituted for the stops 180,182 to cushion the impact caused when the frame member 132 engages one of the stops 180,182. More specifically, the mounting beam 144 and the plow blade 12 are pivotally movable about the second pivot pin between a first position wherein the mounting beam 144 engages one of the side portions of the frame member 130 and a second position wherein the mounting beam 144 engages the other of the side portions of the frame member 130. In the first position, the stop 180 engages the frame member 130 and in the second position the stop 182 engages the frame member 130. Alternatively, any rubberized member, coating or the like may be used to cushion the engagement between the stops 180,182 and the frame member 130. The stops 180,182 limit the amount of angular displacement of the plow blade 12 relative to the frame member 130 which remains parallel with the front of the vehicle to which the plow blade 12 is mounted. Alternatively, the stops could be disposed on the frame member 130.

With reference to FIG. 2, adjacent a side of the guide member 172 that is opposite the pin 174, a channel 184 is defined. A pair of channel members 186,188 is disposed on the mounting beam 144. The first channel member 186 is at a first position on the mounting beam 144 spaced apart in a first direction from the upper arm 162. The second channel member 188 is at a second position on the mounting beam 144 spaced apart in a second, opposite direction from the upper arm 162. A pair of telescoping cylinders 190,192 connects the channel members 186,188 to the channel 184. More specifically, the first cylinder 190 extends between the first channel member 186 and one end of the channel 184. The second cylinder 192 extends between the second channel member 188 and the other end of the channel 184. The first and second cylinders 190,192 are pivotally connected at their sides to the channel 184 and channel members 186,188. As is known in the art, the cylinders 190,192 may be hydraulically driven to pivot the plow blade 12 about the second pivot pin 132.

With reference to FIGS. 1 and 5, a lift arm 200 is pivotally connected to the upper engaging member 92 of the grasping assembly and extends outwardly therefrom in the direction of the plow blade 12. At or near a distal end 202 of the lift bar 200, a pair of chains 204,206 connect the lift bar 200 to the mounting beam 144. More specifically, the distal end 202 of the lift bar 200 is positioned or extends beyond the second pivot pin 122 and the chains 204,206 extend downwardly to the beam 144 to maintain the plow blade 12 in a generally horizontal orientation even when the blade 12 is pivoted or angled relative to the frame member 132. A lift unit 208 is connected to the lift arm 200 and the vertical cylinder 90. Specifically, the lift unit 208 pivotally connects to a center portion 210 of the lift arm 200 and pivotally connects to center portion 212 of the vertical cylinder 90. The lift unit 208 is adapted to move the lift arm 200 to thereby move the plow blade 12 up and down, i.e., pivoting about first pivot pin 122. At the top end of the vertical cylinder 90, an adjustment mechanism, such as an adjustment screw, enables the mounting assembly to adjust to differing heights of various vehicles.

With the frame assembly 14 semi-permanently mounted or attached to the vehicle as described above, the blade assembly 16 can be readily connected or mounted to the frame assembly 14 on the vehicle. With reference to FIG. 3, the blade assembly 16 is shown resting on the ground. The vertical cylinder 90 is in the expanded position and, thus, the grasping assembly is in the open position which is required for securing the blade assembly 16 to the frame assembly 14 because the upper and lower hooks are separated from one another a distance sufficient to allow the frame assembly 14 to be moved adjacent the blade assembly 16.

When the frame assembly 16 is resting on the ground with the cylinder 90 in its expanded position, the lift bar 120 contacts and directly rests on the ground and a pair of plow blade supports or shoes 214 also contact and directly rest on the ground. The shoes 214 keep the blade 12 from engagement with the ground and protect the blade 12 while the blade assembly 16 is connected to the frame assembly 14. More specifically, the shoes 214 are positioned adjacent each lateral side edge of the plow blade 12 and adjacent the bottom edge of the plow blade 12. The shoes 214 are positioned to scrape the ground when the blade 12 is mounted to a vehicle to guide the blade along the ground. Further, the shoes 214 are positioned to guide the lateral side edges of the blade 12 along curbs. Additionally, the shoes 214 can be rotatably mounted to spin as they ride along curbs.

Also shown in FIG. 3, are limited electrical connections for operating the inventive method and apparatus. The electrical connections are shown schematically for ease of illustration. More specifically, certain electronics 250 (known to the industry) are mounted on the vehicle and are connected to certain electronics 252 (known to the industry) that are mounted on the blade assembly 16. The electronics 250,252 are selectively operatively connected and connectable by manually connecting first plug 244 to second plug 246. Through the electrical connections, the cylinder 90 can be operated and/or controlled by a control unit (not shown) located in the cabin of the vehicle V.

To mount or connect the blade assembly 16 to the frame assembly 14, the vehicle with the frame assembly 14 attached thereto drives or moves toward the blade assembly 16 until the frame assembly 14 contacts the blade assembly 16 or is very near to or adjacent the blade assembly 16, i.e., the vehicle pulls forward until the M-shaped frame 20 is positioned or aligned with the recesses 76 of the lower hooks 72,74 and the recesses of the upper hooks 96,98. Further, the vertical centerline of the M-shaped frame 20 should be generally aligned or only slightly misaligned relative to the vertical cylinder 90. The grasping assembly may then be moved toward its closed or collapsed position which allows the hooks 72,74,96,98 to capture or grasp the M-shaped frame 20.

As the cylinder 90 is collapsed, the upper hooks 72,74 engage the angled portions 100,102 of the M-shaped frame 20. Due to the angled portions 100,102 and the angled orientation of the upper hooks 96,98, the blade assembly 16 is urged to a centered position relative to the frame assembly 14. Further, as the cylinder 90 is collapsed, the lower hooks 72,74 engage the lower horizontal portion 42 of the frame assembly 14 and the lower engaging member 70 rises off the ground. More specifically, if the blade assembly 16 is slightly misaligned relative to the frame assembly 14, the angled portions 80 engage the lower centering guides 56,58 and are urged into a centered position on the frame assembly 14. Thus, when the grasping assembly is in its closed position, i.e., the cylinder 90 is collapsed, the blade assembly 16 is centered and locked to the frame assembly 14 and centrally positioned on the vehicle. Notably, the grasping assembly removably connects to the frame assembly 14 without the use of pins or levers, such as those used in the prior art patents discussed above.

Figure 7:
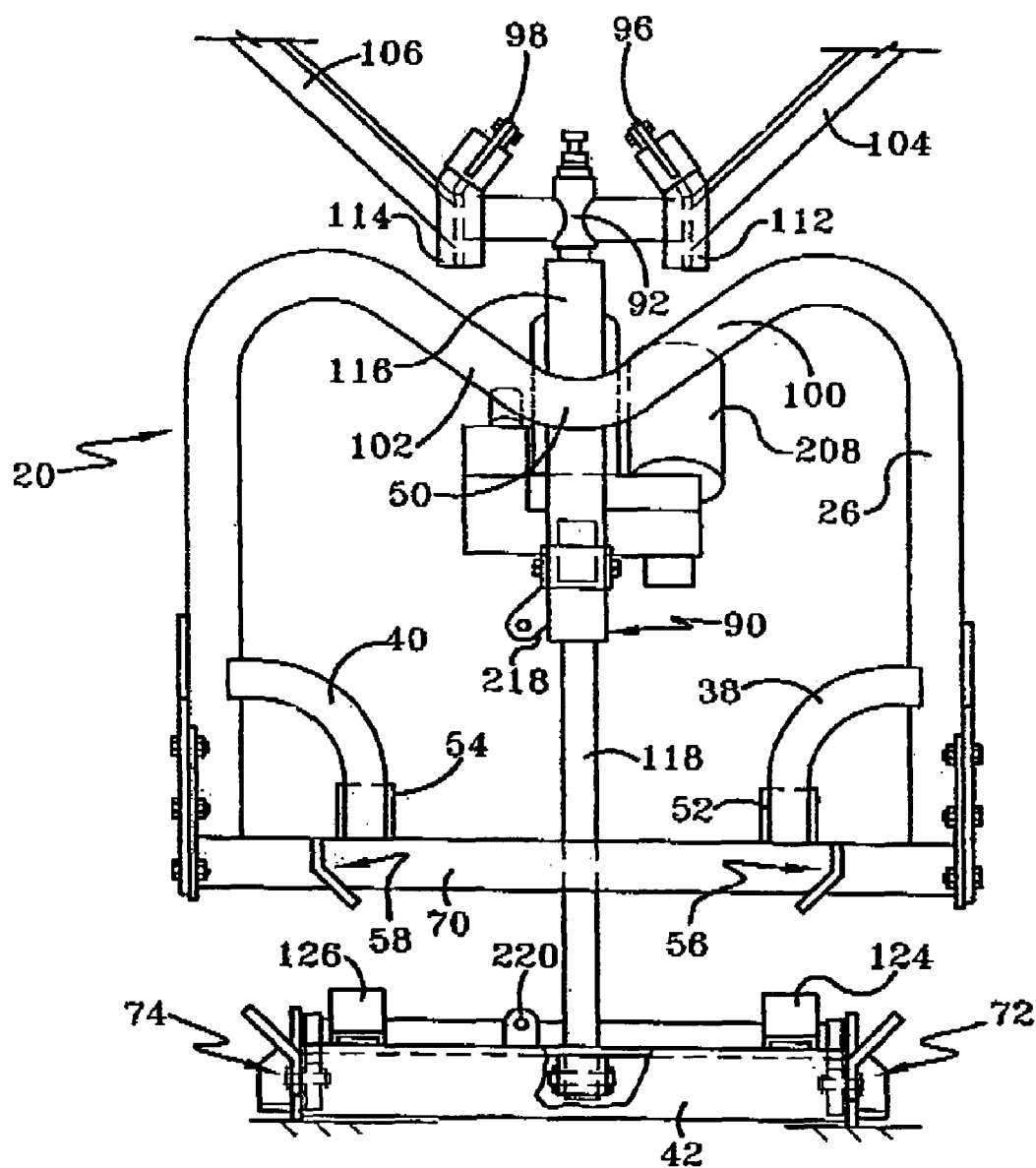
FIG. 7 is an enlarged partial rear perspective view of the plow mounting device of FIG. 1 showing a locking means.
Figure 8:
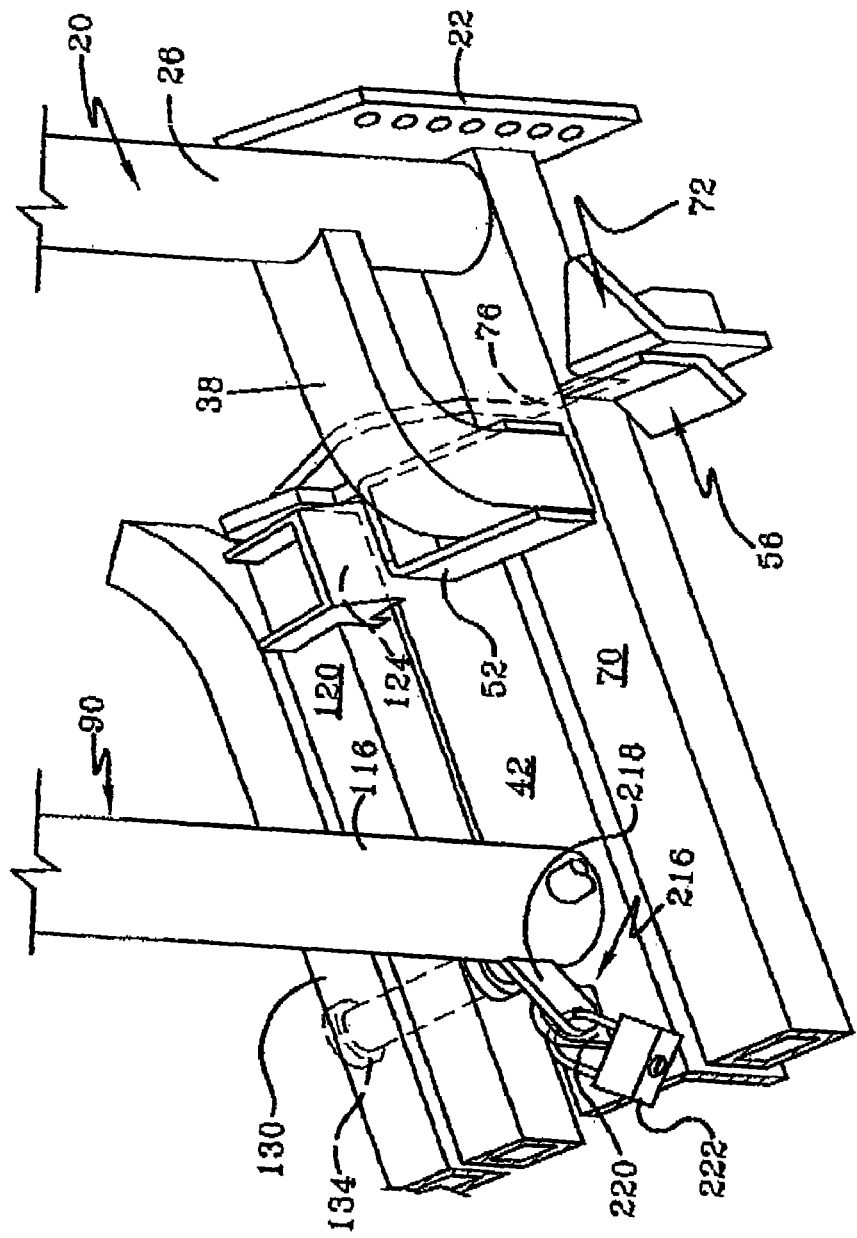
FIG. 8 is an enlarged partial rear perspective view of the plow mounting device of FIG. 1 showing a set of Teflon coated pads on the lower hooks.

To maintain the cylinder 90 in its collapsible position, with reference to FIGS. 6, 7 and 8, a locking means 216 is provided for locking the grasping assembly in its closed position. In the embodiment herein illustrated and described, the locking means is a locking device including a first locking arm or tab member 218 and a second locking arm or tab member 220. The arms 218,220 each have a throughole. More specifically, the first locking arm 218 extends from a distal end of the tubular portion 216 of the cylinder 90. The second locking arm 220 is positioned adjacent the lower hooks 72,74 on the lower engaging member 70. The holes of the first and second locking arms 218,220 are in registry with one another, i.e., aligned, when the grasping assembly is in the closed position. A conventional padlock 222 can be inserted through the aligned holes to lock the cylinder 90 in its closed position which thereby locks the blade assembly 16 to the M-shaped frame 20 of the frame assembly 14. The padlock 222 may be used to prevent unauthorized and/or undesired removal of the blade assembly 16 from the frame assembly 14 and can also serve to deter individuals from tampering with the mounting device 10. With additional reference to FIG. 7, the arms 218,220 are spaced apart from one another when the grasping assembly is in the open position. Of course, other types of locking devices could be used as the locking means and all such locking devices are to be considered within the scope of the present invention.

With reference to FIG. 5, the frame assembly 14 and the blade assembly 16 can be connected to one another as described above but the plow blade 12 will still be resting on the ground. To raise the plow blade 12, the lift unit 208 is activated. The lift unit 208, when activated, causes the lift arm 200 to pivot relative to the upper engaging member 92 which in turn raises the mounting beam 144 via the chains 204,206. This movement lifts the blade 12 off the ground, i.e., the blade, the frame 130 and the lift bar 120 pivot relative to the lower engaging member 70. As the blade 12 is lifted, the frame member 130 pivots or floats relative to the lift bar 120 to position the blade 12 parallel to the ground. FIG. 4 illustrates the frame assembly 14 connected to the blade assembly 16 with the plow blade 12 in the lifted position.

This configuration provides heretofore unavailable leveling of a plow in an upright position. When the operator is driving the vehicle V with the plow 12 in the raised position, the plow assembly remains essentially level, rather than dipping to one side. This valuable quality to obtained by causing the frame member 136 to be pivotally connected to the vehicle V by the first and third pivot pins 122,134 and to the plow by the second pivot pins 132.

To disengage, dismount or disconnect the blade assembly 16 from the frame assembly 14, the lift unit 208 is activated in reverse. The supports 214 of the blade 12 will again rest on the ground as will the lower engaging member 70. If the grasping assembly is locked in the closed position, then the locking means needs to be removed, i.e.; the lock 222 is removed from the aligned holes. Next, the grasping assembly is moved to its open position by moving the cylinder 90 to its expanded or open position. In the open position, the upper hooks 96,98 and the lower hooks 72,74 are separated from one another a distance sufficient to allow the blade assembly 16 to be separated from the frame assembly 14. The vehicle V with the frame assembly 14 mounted therein can then be backed away or moved from the blade assembly 16.

When the blade assembly 16 is disconnected from the frame assembly 14 and resting on the ground, the cylinder 90 may be optionally moved to a collapsed position and locked to prevent unauthorized and/or undesired use of the blade assembly 16. Thus, the holes of the tab members 218,220 are again in registry with one another when the grasping assembly is in the closed position and the lock 222 can be inserted through the holes.

In summary, therefore, the inventive method and apparatus enables one to mount and dismount an implement, such as a snow plow, from a vehicle, such as a pickup truck, with a heretofore unknown simplicity. The method of mounting the plow basically includes the steps of driving the vehicle toward the blade assembly until the frame assembly mounted on the front of the vehicle is in operative proximity to the blade assembly. Generally, that proximity is established by just touching the blade assembly with the frame assembly. Sometimes this is easily determined by the headlights on the frame assembly moving slightly as contact is made. Next, the electrical connections 244,246 are connected and a switch is activated that starts the hydraulic motor on the blade assembly. The telescoping cylinder 90 then retracts, causing the hooks 96,98 to hang the blade assembly onto the frame assembly. As the telescoping cylinder 90 continues to retract, the hooks 72,74 on the lower engaging member 70 engage and finish securing the blade assembly to the frame assembly.

To dismount the plow, the process is reversed. The vehicle is driven to where the plow assembly is to be stored. The switch is activated to cause the telescoping cylinder to extend. The cylinder extends, thereby releasing the hooks 72,74 on the lower engaging member 70. The lower engaging member 70 now operates as a "foot" and supports the blade assembly. The telescoping cylinder 90 continues to extend until the hooks 96,98 are released from the frame assembly 14. At this point, the electrical conduit is broken by separating the electrical connections 244,246 and the vehicle can be driven off.

In the preferred embodiment, the blade assembly 16 has been described as including the grasping assembly that removably connects to the frame assembly 14 semi-permanently mounted to the vehicle V. However, in alternate embodiments, other methods and assemblies can be used to connect the blade assembly 16 to the vehicle V. The blade assembly 16 can include, for example, a vehicle mounting assembly that connects the blade assembly 16 to the vehicle V with the use of pins or levers, semi-permanently connects the blade assembly 16 to the vehicle, etc. Such arrangements may be without the benefits and advantages of the grasping assembly and frame assembly described in reference to the preferred embodiment. Nonetheless, these arrangements may still be able to take advantage of the three pivot connection between the snow blade 12 and the vehicle which allows the plow blade 12 to float to a level on parallel position relative to a surface being plowed. It is to be appreciated that all such arrangements are to be considered within the scope of the present invention.

In one embodiment, the control electronics 250, 252 may be used to control the operation of the plow or device as described above. In this manner, the plow or device may be manually operated by the operator. It is also contemplated in an alternate embodiment that the control electronics may perform certain automatic functions. By automatic functions it is meant that the operator may engage a function of the plow or device wherein the plow or device may perform a plurality of sequential operations responsive to being engaged by the operator. One example of such a function relates to the device lights 110, 108 that may be used in conjunction with the subject invention. In this example, the lights may be sequenced to flash back and forth automatically upon activation by the operator as mentioned above. That is to say that one light may be illuminated while the other remains dark and wherein the lights may alternate in being illuminated by the control electronics and as powered by the vehicle power supply. It is noted that any manner of duration, frequency or the like of flashing the lights may be chosen as is appropriate for use with the subject invention. The sequencing may be controlled by the electronics 250, 252, which may include a logic processing unit, memory and support circuitry. It is noted that the electronics 250, 252 may further include any support equipment or circuitry chosen with sound engineering judgment as is appropriate for use in controlling various automatic functions. The electronics 250, 252 may be preprogrammed with specific sequences of automatic functions prior to installation in an associated vehicle. In this manner, the operator may manually engage a single control function button wherein the electronics 250, 252 automatically perform the predetermined sequence of operation as described herein.

With continued reference to all of the FIGURES, another plow function may include automatic functions that trigger sequences of movements of the plow. In other words, the operator may engage the plow to perform, for example, a "shake" function. The "shake" function may include a sequence of mechanical movements, as powered by the hydraulics on board as described above. In one embodiment, this sequence may include oscillating the plow back and forth with abrupt stops and starts to shake off snow attached to the plow or device. It is noted that any number of shake cycles, duration and the like may be chosen with sound engineering judgment.

In another embodiment, the control electronic 250, 252 may include automatic functions that cycle responsive to the drive gear of the associated vehicle. In this embodiment, the control electronics 250, 252 may automatically raise or lower the plow responsive to the vehicle being in a forward or reverse gear respectively. That is to say that the control electronic 250, 252 may include a first automatic plow function that when the vehicle is shifted into reverse, the electronics 250, 252 automatically lower the plow to the ground or to a predetermined height above the ground. This is especially useful when clearing snow from a narrow region such as a driveway. The operator may engage the first automatic plow function wherein the when the operator drives forward the plow automatically lifts and when the operator drives in reverse the plow automatically lowers. Separately, a second automatic plow function may be programmed to function opposite the first automatic plow function. That is to say that the plow automatically lowers when the operator drives the vehicle forward and automatically rises when the operator drives in reverse. This is especially useful when clearing larger open spaces of snow such a parking lot. It is noted the operator may selectively turn the automatic plow function off and on as desired. A third plow function may include the sequence of lifting the plow and subsequently tilting the plow forward, known as a "stacking function." In this embodiment, the operator may engage the stacking function while driving the vehicle forward whereby the electronics 250, 252 automatically perform the stacking function during operation. This leaves the operator hands free to drive the vehicle.

The automatic functions as controlled by the electronics 250, 252 may be turned off and on by depressing buttons communicated to the control electronics 250, 252. However, it is noted that any manner of engaging or disengaging the automatic function may be chosen with sound engineering judgment, including but not limited to turning knobs, switches and the like.

The invention has been described with reference to the preferred embodiment. Obviously, modifications and alterations will occur to others upon reading and understanding the preceding detailed description. It is intended that the invention be construed as including all such modifications and alterations insofar as they are within the scope of the appended claims and the equivalents thereof.

I claim:

1. A snowplow comprising:

a plow frame member;

a snowplow blade operatively attached to the plow frame member;

a first hydraulic actuator operatively connected between the plow frame member and a first portion of the snowplow blade for use in maneuvering the snowplow blade;

a second hydraulic actuator operatively connected between the plow frame member and a second portion of the snowplow blade for use in maneuvering the snowplow blade;

control electronics operatively connected to engage the first and second hydraulic actuators, wherein the control electronics:

(a) are preprogrammed to automatically cycle the snowplow through one or more sequences of operations;

(b) are operatively connected to selectively independently engage the first and second hydraulic actuators; and, (c) further comprise function engaging means for use in selectively enabling or disabling the control electronics to automatically cycle the snowplow through a sequence of operations, wherein the function engaging means is operatively communicated to the control electronics to selectively enable the one or more sequences of operations.

2. A snowplow comprising:

a plow frame member;

a snowplow blade operatively attached to the plow frame member;

a first hydraulic actuator operatively connected between the plow frame member and a first portion of the snowplow blade for use in maneuvering the snowplow blade;

a second hydraulic actuator operatively connected between the plow frame member and a second portion of the snowplow blade for use in maneuvering the snowplow blade;

control electronics operatively connected to engage the first and second hydraulic actuators, wherein the control electronics:

(a) are preprogrammed to automatically cycle the snowplow through a sequence of operations;

(b) are operatively connected to selectively independently engage the first and second hydraulic actuators; and, (c) are preprogrammed with at least a first sequence of operations to oscillate the snowplow blade back and forth with abrupt movements for use in removing associated snow from the snowplow blade.

3. A snowplow comprising:

a plow frame member;

a snowplow blade operatively attached to the plow frame member;

a first hydraulic actuator operatively connected between the plow frame member and a first portion of the snowplow blade for use in maneuvering the snowplow blade;

a second hydraulic actuator operatively connected between the plow frame member and a second portion of the snowplow blade for use in maneuvering the snowplow blade;

control electronics operatively connected to engage the first and second hydraulic actuators, wherein the control electronics:
 (a) are preprogrammed to automatically cycle the snowplow through a sequence of operations;
 (b) are operatively connected to selectively independently engage the first and second hydraulic actuators; and,
 (c) further comprise function engaging means for use in selectively enabling or disabling the control electronics to automatically cycle the snowplow through a sequence of operations, wherein the function engaging means is operatively communicated to the control electronics and wherein when an associated operator engages the function engaging means the control electronics automatically raises the associated snowplow and tilts the snowplow forward.

4. A snowplow comprising:

a plow frame member;

a snowplow blade operatively attached to the plow frame member;

a first hydraulic actuator operatively connected between the plow frame member and a first portion of the snowplow blade for use in maneuvering the snowplow blade;

a second hydraulic actuator operatively connected between the plow frame member and a second portion of the snowplow blade for use in maneuvering the snowplow blade;

control electronics operatively connected to engage the first and second hydraulic actuators, wherein the control electronics:
 (a) are preprogrammed to automatically cycle the snowplow through a sequence of operations;
 (b) are operatively connected to selectively independently engage the first and second hydraulic actuators; and,
 (c) further comprise function engaging means for use in selectively enabling or disabling the control electronics to automatically cycle the snowplow through a sequence of operations, wherein the function engaging means is operatively communicated to the control electronics;

one or more snowplow lights operatively communicated to the control electronics; and, wherein when an associated operator engages the function engaging means the control electronics automatically flash the one or more snowplow lights.

* * * * *